(12) United States Patent
McInerney et al.

(10) Patent No.: US 9,005,748 B1
(45) Date of Patent: Apr. 14, 2015

(54) COATING CONTAINING BOROSILICATE FLAKE GLASS

(75) Inventors: Terry McInerney, Atlanta, GA (US); Thomas H. Curtis, Decatur, GA (US)

(73) Assignee: Insulating Coatings of America, Inc., Atlanta, GA (US)

( * ) Notice: Subject to any disclaimer, the term of this patent is extended or adjusted under 35 U.S.C. 154(b) by 0 days.

(21) Appl. No.: 13/040,932

(22) Filed: Mar. 4, 2011

(51) Int. Cl.
*C09D 5/26* (2006.01)

(52) U.S. Cl.
CPC .......................................... *C09D 5/26* (2013.01)

(58) Field of Classification Search
CPC ........................................................ C09D 5/26
USPC ........................................................ 428/325
See application file for complete search history.

(56) References Cited

U.S. PATENT DOCUMENTS

| | | | |
|---|---|---|---|
| 1,414,609 A | 5/1922 | Wheeler | |
| 2,420,644 A | 5/1947 | Athy et al. | |
| 3,258,387 A | 6/1966 | Brown et al. | |
| 3,298,882 A | 1/1967 | Waugh et al. | |
| 3,759,852 A * | 9/1973 | Bradley | 428/334 |
| 3,795,524 A | 3/1974 | Sowman | |
| 4,286,013 A | 8/1981 | Daroga et al. | |
| 4,367,919 A | 1/1983 | Tung et al. | |
| 4,412,854 A * | 11/1983 | Layden | 65/442 |
| 4,598,005 A | 7/1986 | Ziegenbein | |
| 4,623,482 A | 11/1986 | Kuo et al. | |
| 4,699,827 A | 10/1987 | Baudry | |
| 4,713,284 A | 12/1987 | Hasegawa et al. | |
| 4,873,137 A | 10/1989 | Deyrup | |
| 4,883,778 A | 11/1989 | SinghDeo et al. | |
| 4,976,761 A | 12/1990 | Allaire | |
| 5,041,321 A * | 8/1991 | Bendig | 428/102 |
| 5,260,125 A | 11/1993 | Copes | |
| 5,330,794 A * | 7/1994 | Bosco et al. | 427/387 |
| 5,362,554 A | 11/1994 | Holzer et al. | |
| 5,378,878 A | 1/1995 | Revesz | |
| 5,391,213 A | 2/1995 | Frövel | |
| 5,733,371 A | 3/1998 | Hashio et al. | |
| 6,030,355 A * | 2/2000 | Callinan et al. | 602/6 |
| 6,362,119 B1 | 3/2002 | Chiba | |
| 6,610,773 B1 | 8/2003 | Sundararaj et al. | |
| 6,770,700 B2 * | 8/2004 | Mueller et al. | 524/494 |
| 6,773,793 B2 | 8/2004 | Flynn et al. | |
| 6,800,125 B2 | 10/2004 | Zimmermann et al. | |
| 6,858,550 B2 | 2/2005 | Ahluwalia | |
| 6,979,661 B1 | 12/2005 | Borrelli et al. | |
| 7,189,454 B2 | 3/2007 | Johnson et al. | |
| 7,531,208 B2 | 5/2009 | Johnson et al. | |
| 7,772,140 B2 | 8/2010 | Bader et al. | |
| 7,799,126 B2 | 9/2010 | Handrosch et al. | |
| 2005/0227558 A1 | 10/2005 | Small, Jr. et al. | |
| 2006/0021643 A1 | 2/2006 | Brensinger | |
| 2007/0218251 A1 | 9/2007 | Jacobs et al. | |
| 2007/0225424 A1 | 9/2007 | Schulz et al. | |
| 2008/0090034 A1 | 4/2008 | Harrison et al. | |
| 2009/0188539 A1 | 7/2009 | Hollinger | |
| 2010/0022383 A1 * | 1/2010 | Kuntz et al. | 502/84 |
| 2010/0044914 A1 | 2/2010 | Ton-That et al. | |
| 2010/0047556 A1 | 2/2010 | Bockmeyer et al. | |
| 2010/0069488 A1 * | 3/2010 | Mabey et al. | 514/531 |
| 2010/0165542 A1 | 7/2010 | Sohn et al. | |
| 2011/0184088 A1 | 7/2011 | Lohmeijer et al. | |
| 2012/0126164 A1 | 5/2012 | Cooray | |

FOREIGN PATENT DOCUMENTS

| | | | |
|---|---|---|---|
| DE | 102010009239 | * | 9/2010 |
| KR | 10-2001-0019064 A | | 3/2001 |
| KR | 10-1005045 B1 | | 12/2010 |
| WO | 2010/100416 A1 | | 9/2010 |

OTHER PUBLICATIONS

International Search Report and Written Opinion for PCT/US2013/043906 mailed Aug. 27, 2013.

* cited by examiner

*Primary Examiner* — D. Lawrernce Tarazano
*Assistant Examiner* — Camie Thompson
(74) *Attorney, Agent, or Firm* — Sutherland Asbill & Brennan LLP

(57) ABSTRACT

A coating material containing borosilicate flake glass is disclosed, together with methods for the preparation and use thereof.

16 Claims, No Drawings

COATING CONTAINING BOROSILICATE FLAKE GLASS

BACKGROUND

1. Technical Field

The present disclosure relates to coating materials, and specifically to coating materials containing borosilicate flake glass.

2. Technical Background

Coatings, such as paints, have traditionally been used to protect an underlying substrate from, for example, oxidation or corrosion, or to impart desirable surface properties to an article. It would be advantageous if a coating could impart other functional properties to a substrate or article, such as, for example, thermal management properties. These needs and other needs are satisfied by the compositions and methods of the present disclosure.

SUMMARY

In accordance with the purpose(s) of the invention, as embodied and broadly described herein, this disclosure, in one aspect, relates to coating materials, and specifically to coating materials containing borosilicate flake glass.

In one aspect, the present disclosure provides a substrate comprising a coating material, wherein the coating material comprises flaked borosilicate glass, and wherein the substrate comprises a textile, a polymeric film, or a combination thereof.

In another aspect, the present disclosure provides a method for improving the thermal properties of a material, the method comprising contacting a coating composition comprising borosilicate flake glass with a substrate, wherein the substrate comprises a textile, a polymeric film, or a combination thereof.

In another aspect, the present disclosure provides a method for preparing a thermal barrier material, the method comprising forming a film from a coating composition, wherein the coating composition comprises borosilicate flake glass and a plurality of threads, fibers, or a combination thereof.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a ketone" includes mixtures of two or more ketones.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not. For example, the phrase "optionally substituted alkyl" means that the alkyl group can or can not be substituted and that the description includes both substituted and unsubstituted alkyl groups.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group may be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This may be presumed in structural formulae herein wherein an asymmetric alkene is present, or it may be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A can be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R can be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$_1$, where A and A$_1$ can be, independently, an alkyl, halogenated alkyl, alkenyl, alkynyl, aryl, heteroaryl, cycloalkyl, cycloalkenyl, heterocycloalkyl, or heterocycloalkenyl group described above.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure provides a coating that can improve the thermal management properties of an underlying material. In one aspect, the coating comprises a borosilicate flake glass. In another aspect, the coating can be applied to a textile and/or sheet good. In yet another aspect, the coating can be in the form of a textile and/or sheet good.

Historically, coatings have been utilized to protect an underlying material and/or to impart desirable surface properties, for example, color and/or gloss, thereto. Glass materials have also been added to coatings, such as paints, to impart fire resistant properties. For example, glass beads have been added to paints, such that when exposed to high heat or flame, the glass beads can melt and provide a flame resistant barrier. Glass materials, such as hollow glass spheres, have also been added to reduce the density of paints and coating materials.

In contrast, the coating of the present invention comprises flaked glass, such as, for example, borosilicate glass. In one aspect, the addition of a flaked glass can improve the ability of the resulting coating to dissipate, move, and/or remove heat from an underlying substrate. In another aspect, the addition of a flaked glass can reduce the amount of heat energy transferred to or absorbed by a substrate comprising the inventive coating. While not wishing to be bound by theory, it is not believed that the improved thermal properties of the inventive coating composition are due to the thermal insulation value of the glass itself, such as could be achieved through the addition of glass spheres.

As used herein, the term "coating composition" is intended to refer to a mixture of coating components, such as, for example, flaked glass and a vehicle and/or resin system, prior to drying and/or curing to form a coating. Similarly, the terms "coating" and "coating material" are intended to refer to a cured and/or dried form of the coating composition. It should be understood that a coating formed from a coating composition will typically comprise the same components as the coating composition, except for any volatile components that can evaporate, and/or any components that cross-link or react with other components, a substrate, or a combination thereof.

In one aspect, the coating composition of the present invention can comprise a paint. In another aspect, the coating of the present invention can comprise an epoxy. In another aspect, the coating of the present invention can comprise one or more cross-linkable components. In yet another aspect, the coating of the present invention can comprise any coating capable of binding to and/or adhering to at least a portion of a substrate for a period of time. In another aspect, the coating composition does not comprise an epoxy. In still another aspect, the coating composition does not comprise a cross-linkable component, such as, for example, a cross-linkable silicone.

The coating composition of the present invention comprises a glass. In various aspects, the glass can be any glass or mixture of glass materials that can impart the desired thermal management properties to an underlying or coated material. In one aspect, the glass comprises boron. In another aspect, the glass comprises a borosilicate glass. In various aspects, the glass can comprise one or more of the following: boron, silica, alumina, calcium oxide, potassium and/or sodium oxides, lead, or a combination thereof. In another aspect, the glass does not comprise lead. In yet another aspect, the glass does not comprise a heavy metal. It should be understood that glass compositions vary, and that the specific composition of any particular glass or mixture of glasses can comprise other items not specifically recited herein.

In an exemplary aspect, the glass comprises from about 20 wt. % to about 50 wt. % boron, for example, about 20, 22, 24, 26, 28, 30, 32, 34, 36, 38, 40, 42, 44, 46, 48, or 50 wt. % boron. In other aspects, the amount of boron in a glass composition can be less than about 20 wt. % or greater than about 50 wt. %, and the present invention is not intended to be limited to any particular amount of boron in a glass composition. In another aspect, the glass comprises from about 30 wt. % to about 70 wt. % silica, for example, about 30, 33, 36, 39, 42, 45, 48, 51, 54, 57, 60, 63, 66, 69, or 70 wt. % silica. In other aspects, the amount of silica present can be less than about 30 wt. % or greater than about 70 wt. %, and the present invention is not intended to be limited to any particular amount of silica. In another aspect, the glass comprises, if at all, from about 0 wt. % to about 2 wt. % alumina, for example, about 0, 0.01, 0.05, 0.1, 0.15, 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, or 2 wt. % alumina. In another aspect, the glass does not comprise alumina. In yet another aspect, the glass can comprise greater than about 2 wt. % alumina, and the present invention is not intended to be limited to any particular amount of alumina. In another aspect, the glass comprises, if at all, from about 0 wt. % to about 5 wt. % calcium oxide, for example, about 0, 0.01, 0.02, 0.05, 0.1, 0.15, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, or 5 wt. % calcium oxide. In one aspect, the glass does not comprise calcium oxide. In still another aspect, the glass comprises greater than about 5 wt. % calcium oxide. In another aspect, the present invention is not intended to be limited to any particular amount of calcium oxide in a glass composition. In another aspect, the glass comprises, if at all, from about 0 wt. % to about 15 wt. % of potassium and/or sodium oxide, for example, about 0, 0.01, 0.02, 0.05, 0.1, 0.15, 0.2, 0.3, 0.4, 0.5, 0.75, 1, 1.5, 2, 2.5, 3, 3.5, 4, 4.5, 5, 6, 7, 8, 9, 10, 11, 12, 13, 14, or 15 wt. % of potassium and/or sodium oxide. In one aspect, the glass does not comprise potassium oxide. In another aspect, the glass does not comprise sodium oxide. In yet another aspect, the glass does not comprise an oxide of potassium and sodium. In another aspect, the glass comprises greater than about 15 wt. % of a potassium and/or sodium oxide. The present invention is not intended to be limited to any particular amount of a potassium and/or sodium oxide in the glass composition. In another aspect, the glass composition can comprise, if at all, from about 0 wt. % to about 15 wt. % lead, for example, about about 0, 0.01, 0.02, 0.05, 0.1, 0.15, 0.2, 0.3, 0.4, 0.5, 0.75, 1, 1.5, 2, 2.5, 3, 3.5, 4, 4.5, 5, 6, 7, 8, 9, 10, 11, 12, 13, 14, or 15 wt. % lead. In another aspect, the glass does not comprise lead. In yet another aspect, the glass comprises greater than about 15 wt. % lead. Thus, the present invention is not intended to be limited to any particular amount of lead in the glass composition. In a specific aspect, the glass comprises from about 20 wt. % to about 50 wt. % boron, from about 30 wt. % to about 70 wt. % silica, from about 0.01 wt. % to about 2 wt. % alumina, from about 0.01 wt. % to about 5 wt. % calcium oxide, from about 0.01 wt. % to about 15 wt. % of an oxide of potassium and/or sodium, and from about 0.01 wt. % to about 15 wt. % lead.

In one aspect, the glass can comprise a varying morphology, such as, for example, can occur from crushing and/or grinding a glass composition. In one aspect, at least a portion of the glass comprises a flake morphology. In another aspect, at least a portion of the glass comprises a needle morphology. In yet another aspect, at least a portion of the glass particles are flat or substantially planar. In other aspects, the morphology of all or a portion of the glass particles is irregular and can vary from at least another portion of the glass particles. In another aspect, all or substantially all of the glass comprises a flake morphology. In one aspect, the glass does not comprise glass spheres, glass microspheres, or a combination thereof. In another aspect, the glass does not comprise a plurality of irregular shaped particles as can occur from crushing and/or grinding a glass composition. In yet another aspect, the glass is not intended to impart a reflective property to the resulting coating as can be achieved, for example, with glass spheres in traffic marking paint. In still other aspects, the glass does not comprise a coating of iron oxide, titania, rutile titanium dioxide, pyrolyzed carbon containing ionic species, silver, or a combination thereof. In yet another aspect, the glass is not designed or intended to melt and form a flame resistant barrier upon exposure to heat.

In one aspect, the glass is particulate, wherein at least a portion of the particles have an average size in at least one dimension of from about 5 micrometers to about 100 micrometers, for example, about 5, 7, 9, 11, 13, 15, 17, 19, 21, 23, 25, 27, 29, 31, 33, 35, 37, 39, 43, 47, 51, 55, 59, 63, 67, 71, 75, 79, 83, 87, 91, 95, 99, or 100 micrometers. In another aspect, at least a portion of the particles have an average size in at least one dimension of from about 5 micrometers to about 45 micrometers, for example, about 5, 6, 8, 10, 12, 14, 16, 18, 20, 22, 24, 26, 28, 30, 32, 34, 36, 38, 40, 42, 44, or 45 micrometers. In still other aspects, at least a portion of the glass particles can have an average size in at least one dimension of less than about 5 micrometers or greater than about 100 micrometers, and the present invention is not intended to be limited to any particular size glass particles. Moreover, it should be understood that the size of glass particles is a distributional property and that the average and standard deviation for a particular batch of particles can vary.

In one aspect, at least a portion of the glass particles can have an aspect ratio of from about 1.001:1 to about 1000:1, for example, at least about 1.001:1, 1.005:1, 1.01:1, 1.05:1, 1.1:1, 1.2:1, 1.4:1, 1.6:1, 1.8:1, 2:1, 3:1, 4:1, 5:1, 6:1, 7:1, 8:1, 9:1, 10:1, 12:1, 14:1, 16:1, 18:1, 20:1, 22:1, 24:1, 26:1, 28:1, 30:1, 35:1, 40:1, 45:1, 50:1, 55:1, 60:1, 70:1, 80:1, 90:1, 100:1, 125:1, 150:1, 175:1, 200:1, 225:1, 250:1, 300:1, 400:1, 500:1, 600:1, 700:1, 800:1, 900:1, or 1000:1. In other aspects, the aspect ratio of at least a portion of the glass particles can be greater than about 1000:1. In another aspect, the aspect ratio of at least half of the glass particles is greater than about 100:1. In yet another aspect, the aspect ratio of all or substantially all of the glass particles is at least about 100:1.

In one aspect, the glass particles can be contacted with and/or mixed with a paint or other coating composition component. In various aspects, the coating composition can comprise a paint, such as, for example, a latex paint, an alkyd paint, an acrylic paint, or a combination thereof. In a specific aspect, the coating composition comprises a latex paint. In other aspects, the coating material can comprise an epoxy, an elastomeric material, or a cross-linkable material. In other aspects, the coating composition can comprise other resin systems or components that can for a coating upon, for example, curing and/or drying. In one aspect, the coating composition does not comprise a pyrolyzed carbon containing ionic species. In another aspect, the coating composition does not comprise ceramic particles. In still other aspects, the coating composition does not comprise one or more of a clay, a binder material, or a combination thereof. In yet another aspect, the coating composition does not comprise a silicone and/or cross-linkable silicone component, such as, for example, an organosilicon. In another aspect, the coating composition and/or the resulting coating material is not a cosmetic composition that can be applied to, for example, a living tissue. In another aspect, the coating composition is not an insulation paste, such as, for example, an electrical insulation paste that is designed to be used in an electrical circuit or device.

Any of the individual components of a coating composition can be contacted and/or mixed in any order. In one aspect, each of the components of a coating composition can be contacted simultaneously. In another aspect, one or more components, such as, for example, the glass flake, can be added at a different time. In still another aspect, a commercially available coating composition can be used, wherein one or more components, such as, for example, glass flake, are subsequently added. In one aspect, any of the individual components can be contacted and/or mixed so as to form a final coating composition prior to contacting with a substrate. In another aspect, one or more of the individual components can be contacted and/or mixed after contacting at least one other component with a substrate. For example, a commercially available coating composition can be contacted with a substrate, and then a quantity of glass flake can be added to, mixed with, and/or dispersed in the coating composition that is in contact with the substrate.

It should be understood that the particular composition and rheology of a coating composition can vary, depending upon, for example, the specific components and intended application thereof. In various aspects, the coating composition can comprise an aqueous or waterborne system. In other aspects, the coating composition can comprise a nonaqueous system. In still other aspects, the coating composition and/or the resulting coating can be at least partially resistant to weathering, such as, for example, a paint intended for outdoor use.

The coating composition can comprise any formulation that can provide a desired final coating. In various aspect, the coating composition can comprise one or more of: rheological aids, binding agents, plasticizers, surfactants, pigments, dyes, defoaming agents, or a combination thereof.

An exemplary coating composition can comprise one or more of the following: water, Tamol® (available from Rohm & Haas), Surfynol® CT-131 and/or Surfynol® 104 DPM (available from Air Products), ammonium hydroxide (e.g., 28%), Ti-Pure® R-706 (available from DuPont), Vicron 15-15 (available from Specialty Minerals Inc.), Foamaster® 111 (available from Henkel), Avanse® MV-100 (available from Rohm & Haas), Dowanol® DPM dipropylene glycol methyh ether (available from Dow Chemicals), Texanol® 2,2,4-trimethylpentanediol-1,3-monoisobutyrate (available from Eastman Chemical Company), TEG-EH (available from Eastman Chemical Company), sodium nitrate (e.g., 15% solution), PROXEL® BD20 (available from Avecia Inc.), Acrysol® RM-12W (available from Rohm & Haas), Degussa Aqua-Chem® 895 colorant, or a combination thereof.

In another aspect, a coating composition can be prepared in concentrated form that can be let-down, wherein the concentrate comprises water, a dispersant, a grind aid, a surfactant, ammonium hydroxide, titanium dioxide, calcium carbonate, and a defoamer. In a specific aspect, a coating composition concentrate can comprise about 4.95 wt. % water, about 0.15 wt. % dispersant, about 0.59 wt. % grind aid, about 0.2 wt. % surfactant, about 0.25 wt. % ammonium hydroxide (28%), about 14.84 wt. % titanium dioxide, about 4.95 wt. % calcium carbonate, and about 0.4 wt. % defoamer.

In such an aspect, the concentrate can be let-down to an end-use composition, wherein the let-down composition can comprise one or more of: a styrenated acrylic latex, a coalescent, a plasticizer, a rush inhibitor, a preservative, a thickener, a colorant, or a combination thereof. In a specific aspect, a let-down composition comprises about 67.8 wt. % of a styrenated acrylic latex, about 2.89 wt. % of a DPM coalescent, about 1.33 wt. % of Texanol® coalescent, about 0.4 wt. % plasticizer, about 0.4 wt. % rust inhibitor, about 0.1 wt. % preservative, about 0.18 wt. % thickener, and colorant.

It should be understood that the coating compositions specifically recited herein are intended to be exemplary only, and that the present invention is not intended to be limited to any particular coating composition. As such, one of skill in the art, in possession of this disclosure, could readily select an appropriate coating composition for use with a given substrate and/or for an intended application.

Exemplary colorants, if present, can comprise one or more of: Fed 595B, titanium dioxide, red oxide, yellow oxide, phthalo green, phthalo blue, lamp black, or a combination thereof. In one aspect, the coating composition comprises at least titanium dioxide.

In another aspect, the coating composition can have a low volatile organic content, such as, for example, about 100 g/L or less of volatile organics. In another aspect, the coating composition can have a density of from about 1.16 g/ml to about 1.21 g/ml. In other aspects, the volatile organic content and/or density of a coating composition can vary, and the present invention is not intended to be limited to any particular volatile organic content or density.

In other aspects, a coating composition can have a pigment content of from about 17.2 wt. % to about 21.1 wt. %, a shear viscosity of from about 74 to about 79, a film hardness of at least about 3B.

In one aspect, the coating composition comprises no or substantially no lead. In another aspect, the coating composition comprises no or substantially no chromium. In yet another aspect, the coating composition comprises no or substantially no zinc.

The glass particles can be contacted with the paint and/or coating material in any manner suitable for providing a resulting coating. In one aspect, the glass particles and coating material are mixed using conventional means, for example, stirring and/or blending. In other aspects, the glass particles and coating material can be subjected to higher shear forces, such as, for example, in a media mill. In one aspect, at least a portion of the glass particles are dispersed in the coating material. In another aspect, at least a portion of the glass particles, for example, glass flake, are uniformly or substantially uniformly dispersed in the coating composition and/or in the resulting coating. In yet another aspect, all or substantially all of the glass particles are uniformly dispersed in the coating composition and/or the resulting coating. In another aspect, no specific degree of dispersion is necessary, and aggregates or agglomerated glass particles can be present in the coating material.

The amount of glass particles present in a coating composition can be any amount suitable for the intended application. In one aspect, the amount of glass particles present in a coating composition can be an amount sufficient to impart desirable thermal properties to the resulting coating. In another aspect, the amount of glass particles present in a coating composition can be an amount that does not adversely affect the mechanical properties of the resulting coating. In various aspects, the amount of glass particles present in a coating composition can comprise from about 5 wt. % to about 50 wt. %, for example, about 5, 6, 7, 8, 9, 10, 12, 14, 16, 18, 20, 22, 24, 26, 28, 30, 32, 34, 36, 38, 40, 42, 44, 46, 48, or 50 wt. % of the coating composition. In another aspect, the amount of glass particles, such as, for example, glass flake, present in a coating composition can be less than about 5 wt. % or greater than about 50 wt. %, provided that the resulting coating can provide the desired thermal properties, and the present invention is not intended to be limited to any particular concentration of glass particles in the coating composition.

In another aspect, the amount of glass particles present in a resulting coating, for example, after curing and/or drying, can comprise from about 10 wt. % to about 80 wt. %, for example, about 10, 12, 14, 16, 18, 20, 23, 26, 29, 32, 35, 38, 41, 44, 47, 50, 53, 56, 59, 62, 65, 68, 71, 74, 77, or 80 wt. % of the resulting coating. In other aspects, the amount of glass particles present in the resulting coating can be less than about 10 wt. % or greater than about 80 wt. %, and the present invention is not intended to be limited to any particular concentration of glass particles in a resulting coating.

The substrate or material to be coated can be any material suitable for the coating composition and to which improved thermal properties are desired. In one aspect, the substrate comprises a textile. In another aspect, the substrate comprises a sheet good. In various specific aspects, the substrate can comprise a fabric, a non-woven material, a polymeric sheet, a membrane material, or a combination thereof. In one aspect, the substrate can comprise a plurality of threads and/or fibers disposed in a woven, non-woven and/or laid manner, or a combination thereof. In one aspect, the substrate can comprise multiple layers of the same or varying composition. In another aspect, the substrate comprises vinyl. In another aspect, the substrate comprises a polyethylene. In another aspect, the substrate comprises a polyethylene terephthalate. In still other aspects, the substrate can comprise one or more polymeric materials. In one aspect, the substrate can comprise a surface suitable for temporary placement of a resulting coating, wherein the resulting coating can be removed after curing and/or drying. In such an aspect, the substrate can comprise a metal surface, a polymeric surface, such as, for example, polytetrafluoroethylene. In other aspects, the substrate does not comprise a refractory material, a refractory fabric, or a combination thereof. In another aspect, the substrate is not a printed circuit board. In another aspect, the substrate does not comprise clay and/or a clay coating. In yet another aspect, the substrate is not a glass and/or glass-ceramic article. In still another aspect, the substrate is not a ceramic coated laminate. In yet another aspect, the substrate is not a copper foil. In another aspect, the substrate is not adhesive or does not comprise an adhesive material disposed on a surface thereof, for example, a surface opposite the resulting coating. In another aspect, the coating, substrate, and/or combination thereof do not comprise an adhesive material. In such an aspect, the coating composition's ability to adhere to and/or bond with the substrate is not to be construed as an adhesive material. In another aspect, the substrate and/or coated substrate does not comprise an intermediate backing material.

The thickness and dimensions of a substrate can vary, and the present invention is not intended to be limited to any particular thickness or dimension substrate. In one aspect, the substrate can be a flexible material that can be applied to another material as a layer or surface covering. In another aspect, the substrate can be a polymeric material having a thickness of from about 10 μm to about 5,000 μm, for example, about 10, 20, 30, 40, 50, 75, 100, 150, 200, 250, 300, 400, 500, 600, 700, 800, 900, 1,000, 1,250, 1,500, 1,750, 2,000, 2,250, 2,500, 2,750, or 3,000 μm. In other aspects, the substrate can be thinner than about 10 μm or greater than about 3,000 μm.

The coating composition comprising glass particles, as described herein, can be contacted with or coated onto a substrate using any suitable means. In one aspect, the coating composition is sprayed onto at least a portion of the substrate. In another aspect, the coating composition is rolled and/or brushed onto at least a portion of the substrate. In still other aspects, the coating composition can be applied using, for example, a doctor blade, screen printing process, or a combination thereof, to at least a portion of the substrate. In one aspect, one layer of the coating composition is applied. In another aspect, two or more layers, for example, two, three, four, or more, can be applied to at least a portion of the substrate. In another aspect, the coating can form a continuous layer over all or a portion of the substrate. In yet another aspect, the coating can form a discontinuous coating over all or a portion of the substrate. If multiple layers are used, each individual layer can comprise the same or a different composition than any other layer. In addition, each individual layer, if multiple layers are present, can have the same or varying color, thickness, and/or thermal properties.

In one aspect, a coating, once applied, can have a thickness of at least about 3 mil. In another aspect, a coating, once applied, can have a thickness of from about 4 mil to about 8 mil, for example, about 4, 5, 6, 7, or 8 mil. In still other aspects, the thickness of a coating, once applied, can be less than about 3 mil or greater than about 8 mil. In one aspect, the thickness of a coating can be thicker than about 8 mil to improve, for example, mechanical properties and/or the durability of the resulting coating.

The coated substrate can exhibit improved thermal management properties as compared to an uncoated substrated and/or a substrate coated with a conventional paint. In various aspects, the coating can reduce the amount of thermal energy absorbed by the substrate. In one aspect, a coated substrate can remain at about ambient temperature upon exposure to thermal radiation, for example, solar, infrared, convective, or a combination thereof. In another aspect, the inventive coating can significantly reduce and/or prevent the underlying substrate or other materials from absorbing thermal radiation incident upon the coating. In another aspect, a substrate or structure coated with the inventive composition can exhibit a lower temperature upon exposure to, for example, solar radiation, than a comparable substrate or structure not coated with the inventive composition. In various aspects, the temperature of a substrate and/or structure coated with and/or underlying the inventive coating can, upon exposure to solar radiation, have a temperature of up to about 50° F., for example, about 5, 7, 9, 10, 12, 14, 16, 18, 20, 25, 30, 35, 40, 45, or 50° F. lower than a comparable uncoated substrate and/or structure. In other aspects, a coated substrate and/or structure can have a temperature differential of greater than about 50° F. from a comparable substrate and/or structure depending on the particular substrate or structure composition, coating composition, and form and intensity of radiation. In another aspect, a coated substrate and/or structure can, upon exposure to thermal radiation, have a temperature of at least about 50° F., for example, at least about 5, 6, 7, 8, 9, 10, 12, 14, 16, 18, 20, 22, 24, 26, 28, 30, 35, 40, 45, 50° F. or more less than a comparable uncoated substrate and/or structure.

In another aspect, the coating can be formed as a standalone material that can, in various aspects, be subsequently applied to a substrate or other material. In an exemplary aspect, the coating material can be applied to a temporary substrate from which a dried and/or cured coating can be removed. The coating can be applied, for example, by spraying, doctor blade, casting, or other suitable technique. In one aspect, such a coating can comprise a plurality of threads and/or fibers, such as, for example, polymeric fibers, carbon fibers, cellulosic fibers, cotton, jute, or other natural fibers. The threads and/or fibers can, in various aspects, be woven, non-woven (e.g., laid), or a combination thereof to provide structural reinforcement to the coating material. In one aspect, a mat or existing textile can be contacted with the coating composition such that the resulting material comprises a coated textile. In one aspect, the coating can be formed so as to be a layer in contact with a mat or textile. In another aspect, the coating can surround and/or fill in all or at least a portion of the voids of a mat or textile. In yet another aspect, the coating can encapsulate or substantially encapsulate at least a portion of the mat or textile. In another aspect, the coating can be incorporated into a substrate or a portion thereof. In another aspect, the substrate or a portion thereof can be impregnated with the coating composition. In another aspect, individual or bundles or threads and/or fibers can be contacted with a coating composition prior to, during, or after applying to a temporary substrate, but before the coating composition cures and/or dries. In oen aspect, such a resulting composition can be in the form of a film and/or flexible sheet. A coating material, prepared in the above aspects, can be removed from the temporary substrate, and rolled for storage or transportation.

While typical aspects have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° F. or is at ambient temperature, and pressure is at or near atmospheric.

Example 1

In a first example, a latex coating composition comprising a flake borosilicate glass can be applied as a slurry onto a thin (e.g., 25 µm) polymeric substrate, so as to form a coating, before curing and/or drying, from about 100 µm to about 1,250 µm thick. After curing and/or drying, the resulting coating can have a thickness of from about 50 µm to about 875 µm.

Example 2

In a second example, a slurry of a liquid coating composition comprising flake borosilicate glass and a plurality of fibrous threads can be applied to a metallic substrate having a thickness of from about 0.001 inches to about 5 feet. The fibrous threads can, in various aspects, improve the shear strength of the resulting coating. After drying and/or curing, the reinforced coating can be removed from the metallic substrate for later use as, for example, an appliqué or a stand-alone material.

Example 3

In a third example, a vinyl fabric substrate was coated with the inventive coating comprising borosilicate flake glass to a dried coating thickness of about 4 mil. The coated substrate and an uncoated control substrate of the same vinyl composition were each subjected to intense solar radiation. The ambient air temperature during the experiment was 108° F. and the ground surrounding the coated and control substrates was 148° F. After exposure to the solar radiation, the uncoated control structure reached a temperature of 130° F., whereas the coated substrate was 105° F. Thus, the coated substrate remained at approximately the ambient temperature without heating from the solar radiation. In addition, the partially enclosed area underneath the coated substrate was approximately 20° F. cooler than the similarly area underneath the control substrate. Thus, the inventive coating can significantly reduce the amount of incident radiation absorbed and/or transferred to a substrate or underlying material.

Example 4

In a fourth example, a non-woven fabric substrate was contacted with the inventive coating composition comprising borosilicate flake glass, such that the dried coated was incorporated into the substrate, and not merely disposed as a layer on a surface of the substrate. The resulting composite was fabricated into a shelter and subjected to equatorially strong solar heating. A similar control shelter was prepared from an uncoated portion of the non-woven fabric. After exposure to the solar radiation, the temperature of the untreated shelter rose to 135° F., whereas the temperature of the shelter formed from the inventive coating impregnated fabric substrate did not rise about the ambient temperature of 102° F. The temperature inside the shelter comprising the inventive coating was approximately 23° F. cooler than the temperature inside the control shelter.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A coated substrate comprising a non-metal substrate and a coating material disposed on at least a portion of the non-metal substrate,
   wherein the coating material is a paint that comprises flaked borosilicate glass, substantially all of the flaked borosilicate glass has an aspect ratio of at least 100:1, and wherein the coating material is at least partially impregnated in the non-metal substrate, and wherein the coating material does not comprise a cross-linkable silicone component, and wherein the non-metal substrate comprises a textile;
   wherein upon exposure of the coated non-metal substrate to a source of thermal radiation for a period of time, the coated non-metal substrate has a temperature that is less than a temperature of a comparable non-metal substrate that is not coated with the coating material and similarly exposed to the source of thermal radiation.

2. The coated substrate of claim 1, wherein the coating material layer is from about 10 µm to about 5,000 µm thick.

3. The coated substrate of claim 1, wherein the flaked borosilicate glass has an average particle size in at least one dimension of from about 5 µm to about 100 µm.

4. The coated substrate of claim 1, wherein the flaked borosilicate glass comprises flaked borosilicate glass particles and at least a portion of the flaked borosilicate glass particles are substantially planar.

5. The coated substrate of claim 1, wherein the coating material comprises from about 10 wt. % to about 80 wt. % flaked borosilicate glass.

6. The coated substrate of claim 1, wherein the paint is a latex paint or an acrylic paint.

7. A method for improving the thermal properties of a material, the method comprising:
   contacting a coating composition that is a paint comprising flaked borosilicate glass, substantially all of the flaked borosilicate glass comprising an aspect ratio of at least 100:1, with a non-metal substrate to form a coated non-metal substrate; and
   exposing the coated non-metal substrate to a source of thermal radiation for a period of time, wherein the coated non-metal substrate has a temperature that is less than a temperature of a comparable non-metal substrate that is not coated with the coating composition and similarly exposed to the source of thermal radiation;
   wherein the non-metal substrate comprises a textile, and wherein, after contacting, the coating composition is at least partially impregnated in the non-metal substrate, wherein the coating composition does not comprise a cross-linkable silicone component.

8. The coated substrate of claim 1, wherein the coating has a density in the range of about 1.16 g/mL to about 1.21 g/mL.

9. The coated substrate of claim 1, wherein the source of thermal radiation comprises solar radiation, infrared radiation, convective heating, or combinations thereof.

10. The coated substrate of claim 1, wherein the temperature of the coated non-metal substrate is at least about 20° F. less than the temperature of the comparable non-metal substrate that is not coated with the coating material and similarly exposed to the source of thermal radiation.

11. The method of claim 7, wherein the paint is a latex paint or an acrylic paint.

12. The method of claim 7, wherein the temperature of the coated non-metal substrate is at least about 20° F. less than the temperature of the comparable non-metal substrate that is not coated with the coating composition and similarly exposed to the source of thermal radiation.

13. The method of claim 7, wherein, after contacting, the coating composition forms a layer on at least a portion of one surface of the non-metal substrate.

14. A product of the method of claim 7.

15. The method of claim 7, wherein the coating composition has a density in the range of about 1.16 g/mL to about 1.21 g/mL.

16. The method of claim 7, wherein the source of thermal radiation comprises solar radiation, infrared radiation, convective heating, or combinations thereof.

* * * * *